United States Patent
Lee et al.

(10) Patent No.: US 11,467,275 B2
(45) Date of Patent: Oct. 11, 2022

(54) ULTRA-WIDEBAND-BASED OBJECT IDENTIFICATION

(71) Applicant: Logistics and Supply Chain MultiTech R&D Centre Limited, Pok Fu Lam (HK)

(72) Inventors: Kin Keung Lee, Pok Fu Lam (HK); Edward James Jackson, Pok Fu Lam (HK); Ka Lun Fan, Pok Fu Lam (HK)

(73) Assignee: Logistics and Supply Chain Multi Tech R&D Centre Limited, Pok Fu Lam (HK)

( * ) Notice: Subject to any disclaimer, the term of this patent is extended or adjusted under 35 U.S.C. 154(b) by 299 days.

(21) Appl. No.: 16/234,737

(22) Filed: Dec. 28, 2018

(65) Prior Publication Data
US 2020/0209374 A1 Jul. 2, 2020

(51) Int. Cl.
G01S 13/04 (2006.01)
G01S 13/02 (2006.01)
G01S 5/02 (2010.01)
G01S 13/88 (2006.01)

(52) U.S. Cl.
CPC ............ G01S 13/04 (2013.01); G01S 5/0226 (2013.01); G01S 5/0242 (2013.01); G01S 13/0209 (2013.01); *G01S 13/887* (2013.01)

(58) Field of Classification Search
CPC ...... G01S 13/02; G01S 13/0209; G01S 13/04; G01S 5/0226; G01S 5/0242; G01S 7/292; G01S 7/354; G01S 7/493; G01S 7/527; G01S 7/536; G01S 13/887
See application file for complete search history.

(56) References Cited

U.S. PATENT DOCUMENTS

| | | | | |
|---|---|---|---|---|
| 2012/0256786 A1* | 10/2012 | Bowring | ................ | G01S 7/024 342/188 |
| 2015/0379356 A1* | 12/2015 | Nikolova | ................ | G01S 7/024 342/90 |
| 2018/0106897 A1* | 4/2018 | Shouldice | ............ | A61B 5/0507 |
| 2020/0041640 A1* | 2/2020 | Heinen | ................... | G01S 7/412 |
| 2020/0158860 A1* | 5/2020 | Morton | ................ | G01S 13/887 |
| 2020/0166624 A1* | 5/2020 | Gunther | ................ | G01S 13/886 |

FOREIGN PATENT DOCUMENTS

WO    WO-2019183339 A1 *  9/2019  ............ G01S 7/412

OTHER PUBLICATIONS

Carrer et al, "Concealed Weapon Detection Using UWB 3-D Radar Imaging and Automatic Target Recognition", 2014, IEEE—The 8th European Conference on Antennas and Propagation (EuCAP 2014), pp. 2786-2790. (Year: 2014).*

* cited by examiner

*Primary Examiner* — Peter M Bythrow
(74) *Attorney, Agent, or Firm* — Renner, Kenner, Greive, Bobak, Taylor & Weber (57) ABSTRACT

An ultra-wideband-based object identification method and system includes: transmitting, using a transmitter, an ultra wideband signal to an object; receiving, using a receiver, a reflected signal from the object; and determining, using a processor, an identity of the object based on the received reflected signal.

19 Claims, 7 Drawing Sheets

ULTRA-WIDEBAND-BASED OBJECT IDENTIFICATION

TECHNICAL FIELD

The invention relates to ultra-wideband-based object identification.

BACKGROUND

Operators in warehouses and factories often need to check the contents in a box or package for quality assurance or for stock taking. However, the contents in the box or package may not be visible by the operator.

One existing solution to perform checking is by manual inspection, which involves the operator opening the box and package for checking. This solution can be quite inconvenient and cumbersome. Another way to perform checking is by weighing the box or package. When the weight is determined to be within a predetermined range, the object is identified as normal. This solution is rather crude and is susceptible to measurement errors. Yet another way to perform checking is by irradiating X-ray to the box or package. This solution involves large-scale and expensive operation. Also, the ionizing radiation provided by the X-ray may not be suitable for inspection of some types of goods.

SUMMARY OF THE INVENTION

It is an object of the invention to address the above needs, to overcome or substantially ameliorate the above disadvantages or, more generally, to provide an alternative or improved ultra-wideband-based object identification method (and related system).

In accordance with a first aspect of the invention, there is provided an ultra-wideband-based object identification method, comprising: transmitting, using a transmitter, an ultra wideband signal to an object; receiving, using a receiver, a reflected signal from the object; and determining, using a processor, an identity of the object based on the received reflected signal.

Preferably, determining the identity of the object based on the received reflected signal comprises determining presence or absence of the object based on the received reflected signal.

Preferably, determining the identity of the object comprises: comparing the received reflected signal with one or more predetermined signal associated with a known object identity; and determining whether the identity of the object is the object identity associated with any of the one or more predetermined signals based on the comparison.

Preferably, determining whether the identity of the object is the object identity associated with any of the one or more predetermined signals comprises: determining that the identity of the object is the object identity associated with one of the predetermined signals if the received reflected signal matches the one of the predetermined signals.

Preferably, determining whether the identity of the object is the object identity associated with any of the one or more predetermined signals comprises: determining that the identity of the object is the object identity associated with one of the predetermined signals based on the best match of the received reflected signal with the one or more predetermined signals.

Preferably, the received reflected signal matches the one of the predetermined signals when a difference between the received reflected signal and the one of the predetermined signals is less than a difference threshold. The difference threshold may be adjustable (e.g., during operation) or may be fixed.

In one embodiment of the first aspect, the method also includes determining a matching index based on an extent of matching of the received reflected signal with the one or more predetermined signals.

Preferably, the method may also include displaying, at a display, one or more of: the matching index, an indication of the determined identity of the object, etc.

In one embodiment of the first aspect, the method also includes recording the determined identity of the object and increasing a count associated with the identified object identity by one.

In one embodiment of the first aspect, the method also includes providing an alert when the received reflected signal matches none of the one of the predetermined signals.

Preferably, the transmitter and the receiver are arranged in a transceiver unit.

Preferably, the object is arranged in a container such that the object is not visible.

In accordance with a second aspect of the invention, there is provided an ultra-wideband-based object identification system, comprising: a transmitter for transmitting an ultra wideband signal to an object; a receiver for receiving a reflected signal from the object; and a processor for determining an identity of the object based on the received reflected signal.

Preferably, the processor is arranged to determine presence or absence of the object based on the received reflected signal.

Preferably, the processor is arranged to determine the identity of the object by comparing the received reflected signal with one or more predetermined signal associated with a known object identity; and determining whether the identity of the object is the object identity associated with any of the one or more predetermined signals based on the comparison.

Preferably, the processor is arranged to determine whether the identity of the object is the object identity associated with any of the one or more predetermined signals by determining that the identity of the object is the object identity associated with one of the predetermined signals if the received reflected signal matches the one of the predetermined signals.

Preferably, the processor is arranged to determine whether the identity of the object is the object identity associated with any of the one or more predetermined signals by: determining that the identity of the object is the object identity associated with one of the predetermined signals based on the best match of the received reflected signal with the one or more predetermined signals.

Preferably, the received reflected signal matches the one of the predetermined signals when the processor determines that a difference between the received reflected signal and the one of the predetermined signals is less than a difference threshold. The difference threshold may be adjustable (e.g., during operation) or may be fixed.

In one embodiment of the second aspect, the processor is further arranged to determine a matching index based on an extent of matching of the received reflected signal with the one or more predetermined signals.

In one embodiment of the second aspect, the system also includes a display operably connected with the processor for displaying one or more of: the matching index, an indication of the determined identity of the object, etc.

Preferably, the processor is further arranged to record the determined identity of the object and increase a count associated with the identified object identity by one.

Preferably, the transmitter and the receiver are arranged in a transceiver unit.

Preferably, the object is arranged in a container such that the object is not visible.

Preferably, the system is integrated in a stand-alone object identification device. More preferably, the object identification device is portable.

BRIEF DESCRIPTION OF THE DRAWINGS

Embodiments of the invention will now be described, by way of example, with reference to the accompanying drawings in which.

DETAILED DESCRIPTION

Figure 1:
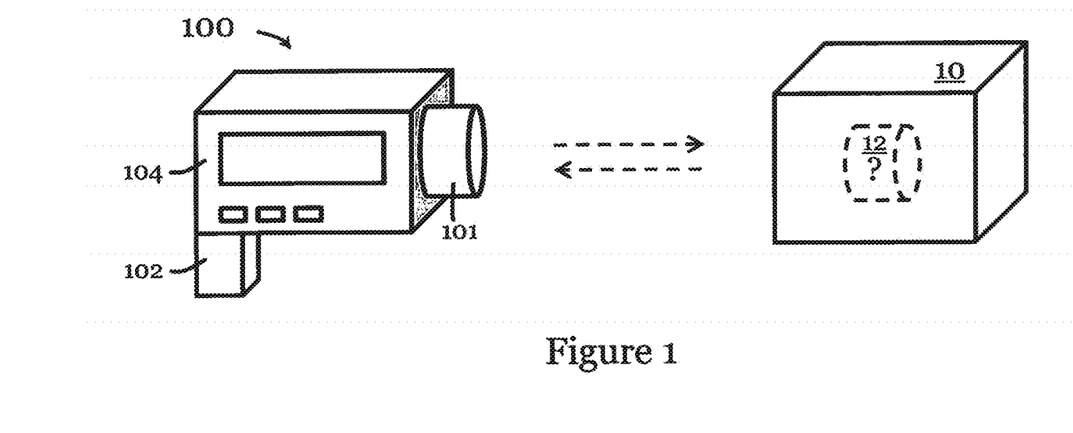
FIG. 1 is an ultra-wideband-based object identification device in one embodiment of the invention.

FIG. 1 shows an ultra-wideband-based (UWB-based) object identification device 100 in one embodiment of the invention. The device 100 includes a body 104 and a handle 102 coupled to the body 104. The user can hold onto the handle 102 and use the device 100 as a portable device. A UWB transceiver tot is mounted on the body 104 for transmitting signal to an object 10 to be tested and for receiving signal reflected from the object 10. In this embodiment, the object 10 is arranged in a box (or package) 12 that conceals the object 10.

Figure 2:
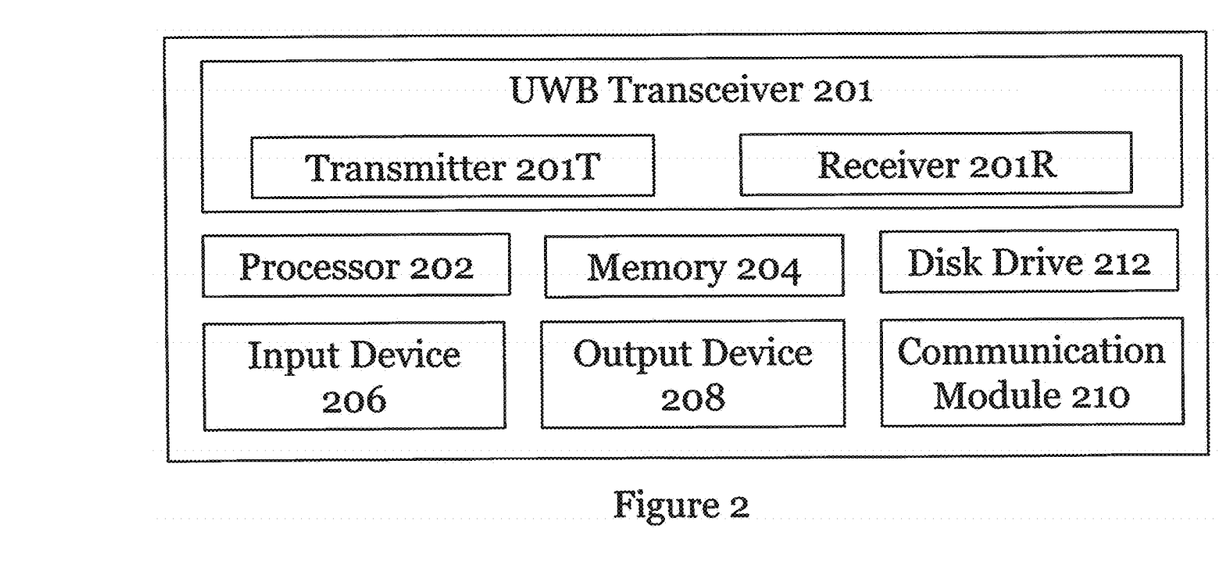
FIG. 2 is a block diagram of an ultra-wideband-based object identification system in one embodiment of the invention.

FIG. 2 is a block diagram of the main components of an ultra-wideband-based object identification system 200 in one embodiment of the invention. The system 200 may have different configurations, and it may be implemented in a single device or distributively in multiple operably connected devices. The system 200 generally includes suitable components necessary to receive, store, and execute appropriate computer instructions, commands, or codes. In this embodiment, the main components of the system 200 include a UWB transceiver 201 with a transmitter 201T and a receiver 201R. The transmitter 201T and receiver 201R may be the same part or they may be distinct parts. The system 200 also includes a processor 202 and a memory 204. The processor 202 may be formed by one or more CPU, MCU, controllers, logic circuits, Raspberry Pi chip, etc. The memory 204 may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations. The system 200 further includes one or more input devices 206 such as a keyboard, a mouse, a stylus, an image scanner, a microphone, a tactile input device (e.g., touch sensitive screen), and an image/video input device (e.g., camera). The system 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The system 200 may further include one or more disk drives 212 which may encompass solid state drives, hard disk drives, optical drives, flash drives, and/or magnetic tape drives. A suitable operating system may be installed in the system 200, e.g., on the disk drive 212 or in the memory 204. The memory 204 and the disk drive 212 may be operated by the processor 202. The system 200 also includes a communication module 210 for establishing one or more communication links (not shown) with one or more other computing devices such as servers, personal computers, terminals, tablets, phones, or other wireless or handheld computing devices. The communication module 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. The transceiver 201, the processor 202, the memory 204, the input device(s) 206, the output device(s) 208, the communication module 210 and the disk drives 212 are connected with each other through a bus, a Peripheral Component Interconnect (PCI) such as PCI Express, a Universal Serial Bus (USB), an optical bus, or other like data and/or power bus. Although not illustrated, the system may be powered by DC power source (e.g., battery cells, battery packs) or AC power source (e.g., with power cord and plug for connection to AC mains socket). The system may be further connected with one or more external data storage or server, through the communication module 210.

A person skilled in the art would appreciate that the system 200 shown in FIG. 2 is merely exemplary. The device 500 in FIG. 1 may have the same construction as the ultra-wideband-based object identification system 200.

Figure 3:
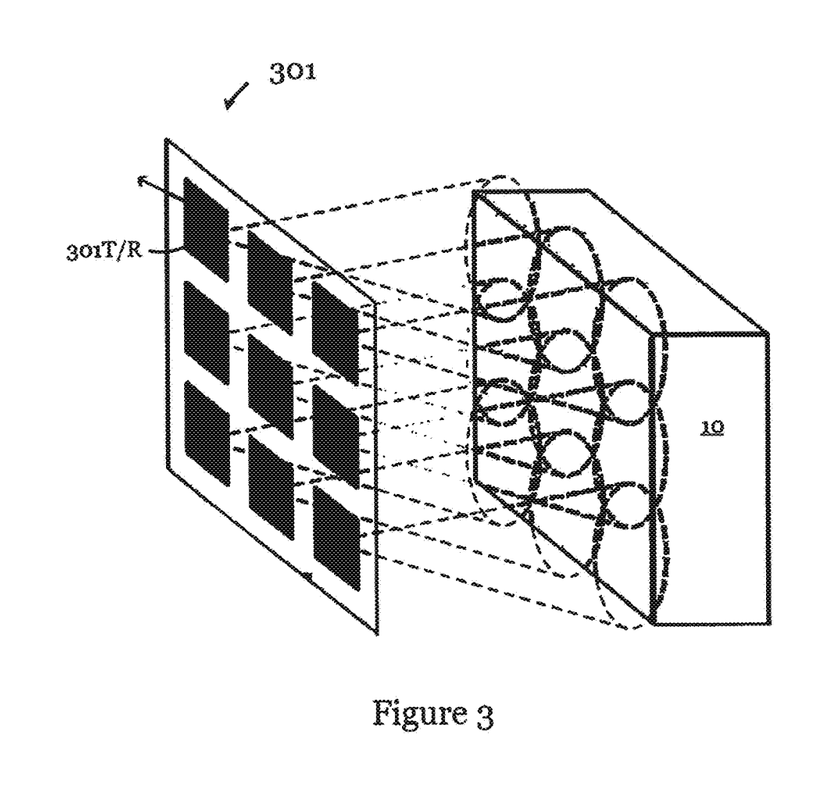
FIG. 3 is a transmitter and receiver arrangement of an ultra-wideband-based object identification device in one embodiment of the invention.
Figure 4:
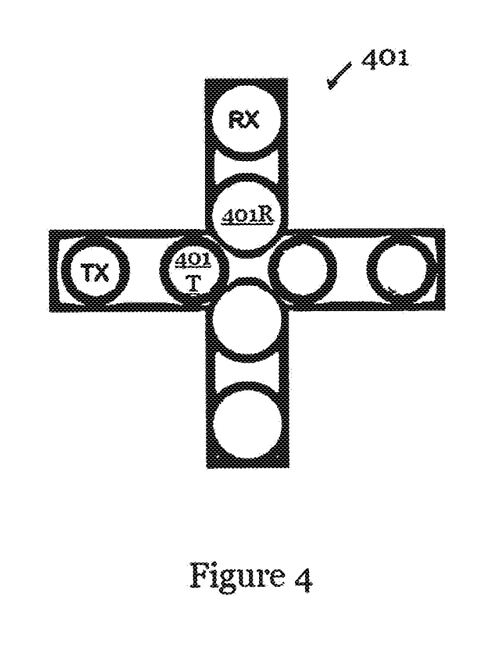
FIG. 4 is a transmitter and receiver arrangement of an ultra-wideband-based object identification device in another embodiment of the invention.

FIGS. 3 and 4 are exemplary UWB transmitter and receiver arrangements of the invention. In FIG. 3, the UWB transceiver 301 includes nine transmitter and receiver units 301T/R, arranged in an array of 3 rows and 3 columns, and each operable as both a transmitter and a receiver. In FIG. 4, the UWB transceiver 401 includes four transmitters 401T and four receivers 401R, arranged in a Mills cross array, with one horizontal row of four transmitters 401T and a vertical column of four receivers 401R. These UWB transmitter and receiver arrangements in FIGS. 3 and 4 can be incorporated in the device 100 of FIG. 1 and the system 200 of FIG. 2.

Figure 5:
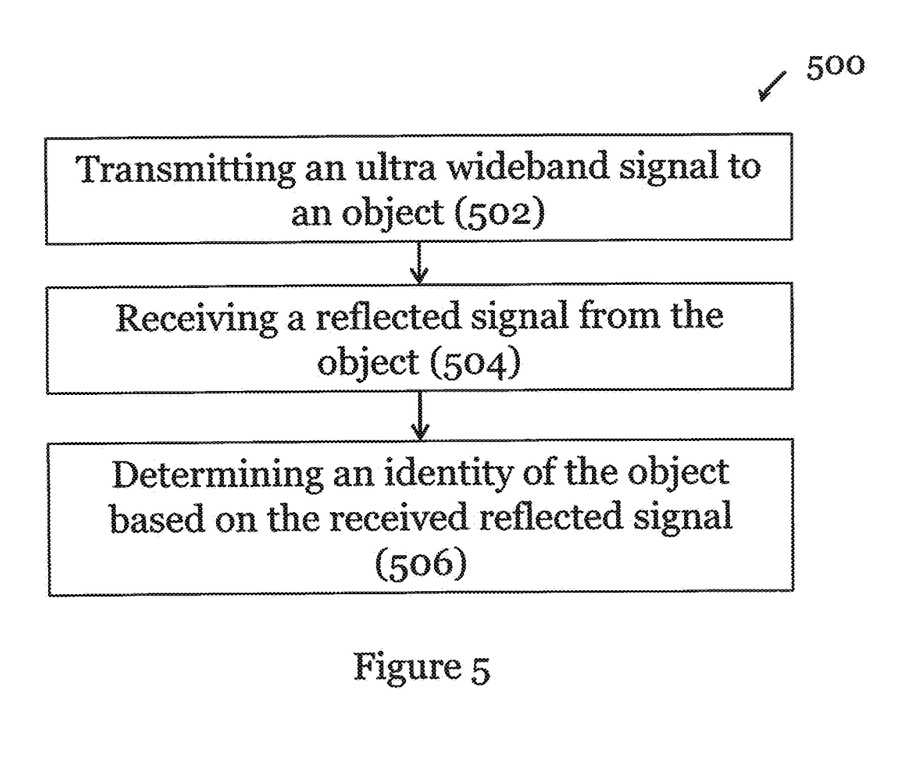
FIG. 5 is a flow chart of an ultra-wideband-based object identification method in one embodiment of the invention.

FIG. 5 illustrates an ultra-wideband-based object identification method 500 in one embodiment of the invention. To simply discussion, the method 500 makes reference to only one transmitter and receiver. It should be noted, however, that the method 500 can well be applied to embodiments with multiple transmitters and receivers.

The method 500 begins in step 502, in which an ultra wideband signal is transmitted to the object, e.g., using the transmitter of the device 500 or system 200. Then, in step 504, a reflected signal (e.g., waveform) from the object is received, e.g., at the receiver of the device 500 or system 200. In step 506, the identity of the object is determined based on the received signal, e.g., using the processor of the device 500 or system 200. The determination of the identity of the object may include determining presence or absence of object based on the received reflected signal. The method 500 may further include recording the determined identity of the object and increasing a count associated with the identified object identity by one, e.g., using the processor of the device 500 or system 200.

Details of the determination in step 506 will be further described below with reference to FIGS. 6 and 7.

Figure 6:
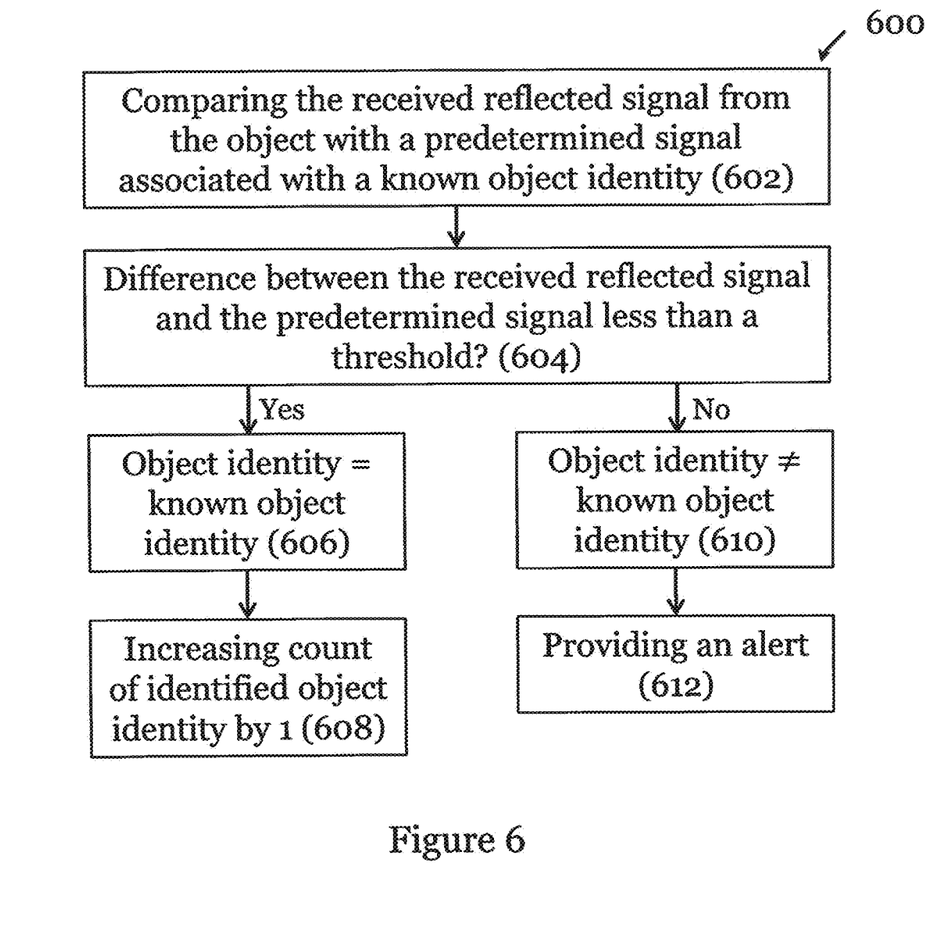
FIG. 6 is a flow chart of the determination step of FIG. 5 in one embodiment of the invention.

FIG. 6 shows one implementation 600 of the determination step 500 of FIG. 5. To simply discussion, the method 600 makes reference to only one transmitter and receiver. It should be noted, however, that the method 600 can well be applied to embodiments with multiple transmitters and receivers.

The method 600 begins in step 602, in which the received reflected signal (from the object) is compared with a predetermined signal associated with a known object identity. The predetermined signal is determined prior to operation, and is stored, e.g., in the memory of the device 100 or system 200. The comparison in step 602 may be performed by the processor of the device 100 or system 200. Then, in step 604, a determination is made as to whether a difference between the received reflected signal and the predetermined signal is less than a threshold. The determination step may be performed by the processor of the device 100 or system 200. The threshold may be fixed or adjustable. Step 604 can be considered as determining the matching, or an extent of matching between the received reflected signal and the predetermined signal.

If the difference is determined to be less than the threshold, then in step 606, the identity of the object is determined to be that of the known object identity associated with the predetermined signal. The determination step may be performed by the processor of the device 100 or system 200. Subsequently, in step 608, the count of the identified object identity is increased by one, e.g., by the processor and memory of the device 100 or system 200. Preferably, the device 100 or system 200 maintains a count of the identified object identity for recording.

Alternatively, if the difference is determined to be not less than the threshold, then in step 610, the identity of the object is determined to be not that of the known object identity associated with the predetermined signal. Subsequently, in step 612, an alert is provided, e.g., by the input/output device(s) of the device 100 or system 200.

In some embodiments, the method 600 may also include displaying, at the display of the device 100 or system 200, a matching index that indicates an extent of matching of the received reflected signal with the predetermined signal, or an indication of the determined identity of the object, or both.

Figure 7:
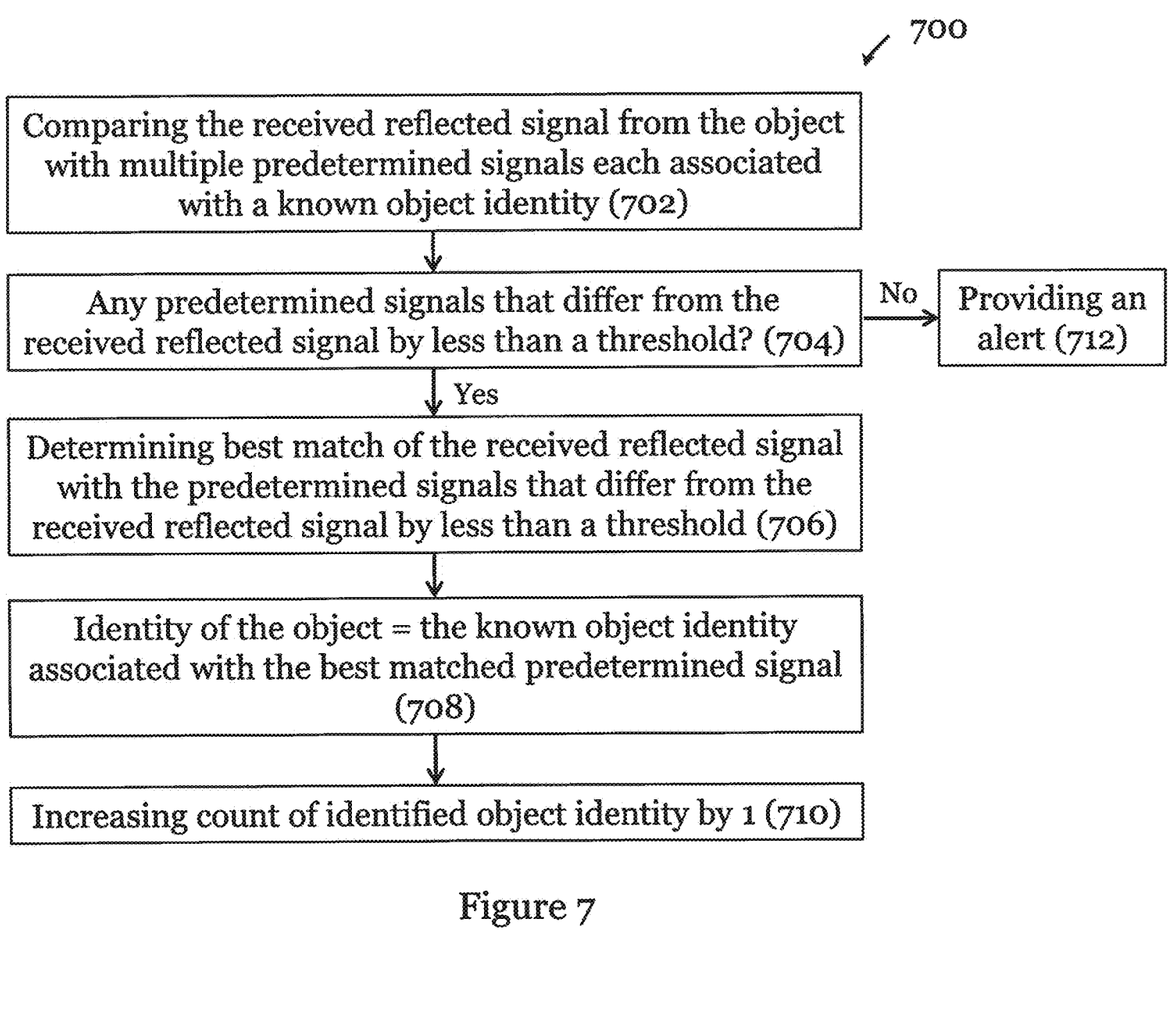
FIG. 7 is a flow chart of the determination step of FIG. 5 in one embodiment of the invention.

FIG. 7 shows one implementation 700 of the determination step 500 of FIG. 5. To simply discussion, the method 700 makes reference to only one transmitter and receiver. It should be noted, however, that the method 700 can well be applied to embodiments with multiple transmitters and receivers.

The method 700 begins in step 702, in which the received reflected signal (from the object) is compared with multiple predetermined signals each associated with a known object identity. The predetermined signals are determined prior to operation, and are stored, e.g., in the memory of the device 100 or system 200. The comparison in step 702 may be performed by the processor of the device 100 or system 200. Then, in step 704, a determination is made, e.g., by the processor of the device 100 or system 200, as to which one(s) of the predetermined signal differ from the received reflected signal by than a respective threshold.

If it is determined that at least one of the predetermined signals differ from the received reflected signal by than a respective threshold, then the method proceeds to step 706, in which a determination is made, e.g., by the processor of the device 100 or system 200, as to which one of the predetermined signals that differ from the received reflected signal by than a respective threshold best matches the received reflected signal. The best match could be the predetermined signal with the smallest difference from the corresponding threshold. Once the best match is determined, then in step 708, the identity of the object is determined to that of the known object identity associated with the bets matched predetermined signal. And in step 710, the count of the respective identified object identity is increased by one, e.g., by the processor and memory of the device 100 or system 200. Preferably, the device 100 or system 200 maintains a count of different object identities associated with the predetermined signals for recording.

Alternatively, if in step 704 it is determined that none of the predetermined signals differ from the received reflected signal by than a respective threshold, then the method proceeds to step 712, in which an alert is provided, e.g., by the input/output device(s) of the device 100 or system 200.

In some embodiments, the method 700 may also include displaying, at the display of the device 100 or system 200, a matching index that indicates an extent of matching of the received reflected signal with the predetermined signal, or an indication of the determined identity of the object, or both.

Figure 8A:
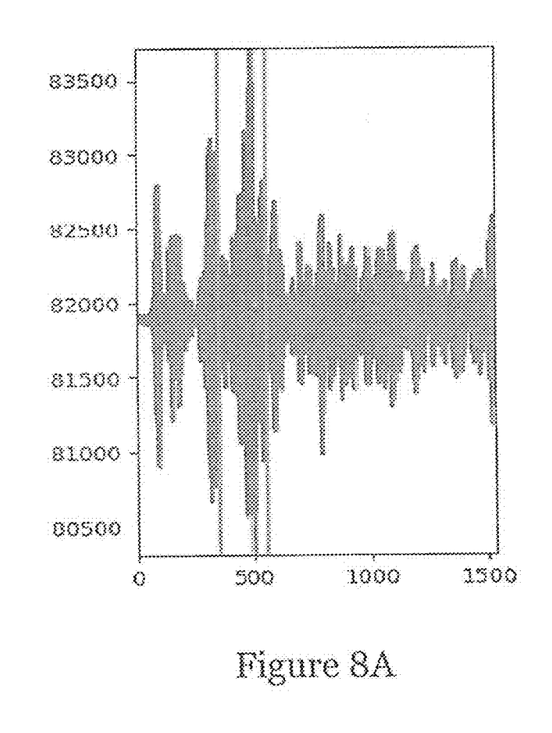
FIG. 8A is a graph showing an exemplary reflected received signal from the object.

FIG. 8A shows an exemplary reflected received signal from the object, e.g., received by system 200 or device 100 in the above embodiments.

Figure 8B:
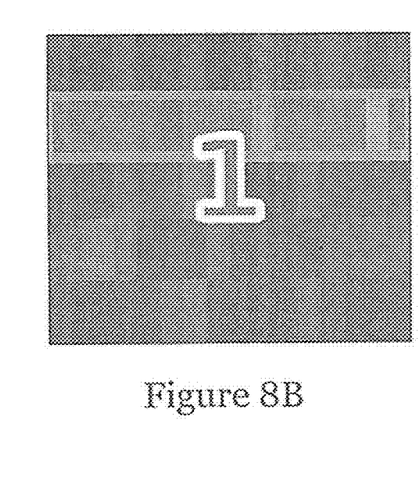
FIG. 8B is a plot showing an output of the ultra-wideband-based object identification method of FIG. 5 in one embodiment of the invention.

FIG. 8B is a display of the output of the ultra-wideband-based object identification method of FIG. 5 in one embodiment of the invention. The display includes grids of different color, representing matching indexes between the received signal and the predetermined signals. The number "1" in the middle indicates the determined identity of the object.

Figure 9:
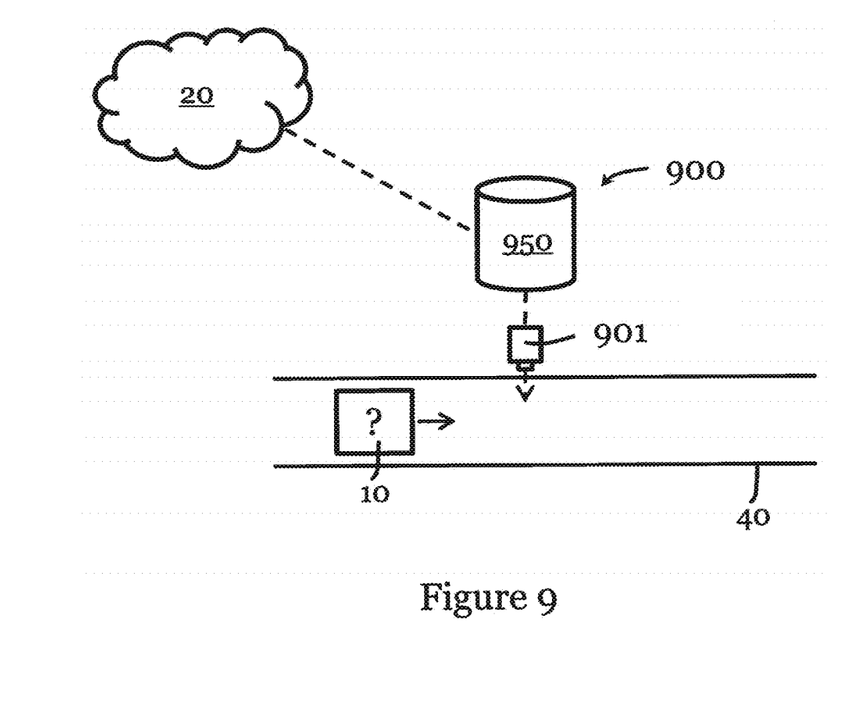
FIG. 9 is an ultra-wideband-based object identification system in one embodiment of the invention.

FIG. 9 is an ultra-wideband-based object identification system 900 in one embodiment of the invention. The system 900 has the same or similar construction as the system 200 of FIG. 2 and the device 100 of FIG. 1. The system 900 generally includes a UWB transceiver operably connected with an information handling system 950. The UWB transceiver 901 is arranged next to a conveyor belt 40 to scan or test object 10 that passes. The UWB transceiver 901 is operably connected with an information handling system 950 that includes processor, memory, input/output devices, disk drives, communication module, etc., like those in the system 200 of FIG. 2. The information handling system 950 of FIG. 9 is operably connected with a remote server 20 for storage and retrieval of information and data (e.g., data measured or recorded by the system 900). In this embodiment, if no match is determined by the system 900, then a responsive action may be taken by the conveyor system. For example, the object 10 may be removed from the conveyor belt 40, or it may be separated from the ones that can be identified or classified. In some embodiments, the conveyor system may separate the objects that have passed the system

900 according to identified classification of the objects (e.g., by directing them to different stations).

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

It will be appreciated by persons skilled in the art that numerous variations and/or modifications may be made to the invention as shown in the specific embodiments without departing from the spirit or scope of the invention as broadly described. For example, the ultra-wideband-based object identification device, system, and method of the invention can be applied to test: object arranged in a box or package that conceals the object, object that is not arranged in any box or package, and object arranged in a box or package that only allows the object 10 be partly visible. The ultra-wideband-based object identification device, system, and method may be implemented on standalone device (e.g., embodiment of FIG. 1) or distributively on multiple devices (e.g., embodiment of FIG. 9). The UWB transceiver may take different form, orientation, number, shape, and size. The number of transmitter and receivers can be selected depending on applications (e.g., the resolution required). The display of the matching index and the indication of the determined identity of the object may take different form. Features in different embodiments can be re-grouped selectively to provide new embodiments. For example, the method in the above embodiments can be applied to the system 200, the device 100, or the system 900, in like manner. The method embodiments may be all implemented in the system 200, the device 100, or the system 900. Alternatively, they may be implemented selectively in the system 200, the device 100, or the system 900. In embodiments with multiple transmitter and receiver elements, the method may be further arranged to analyze the received reflected signals (e.g., waveforms) with most information. Dynamic analysis of multiple received reflected signals received at the same receiver may be performed to reduce analysis and measurement error. In the embodiment of FIG. 9, the information handling system can be a desktop computer, a smart phone, a tablet, a notebook computer, etc.

The described embodiments of the invention should therefore be considered in all respects as illustrative, not restrictive.

The invention claimed is:

1. An ultra-wideband-based object identification method, comprising:

transmitting, using a plurality of transmitters, an ultra-wideband signal to an object;

receiving, using a plurality of receivers, a reflected signal from the object;

determining, using a processor, an identity of the object based on the received reflected signal, the determining including:

comparing the received reflected signal with one or more predetermined signals each associated with a known object identity to create a comparison; and determining, based on the comparison, whether the identity of the object is the object identity associated with any of the one or more predetermined signals, wherein determining whether the identity of the object is the object identity associated with any of the one or more predetermined signals comprises determining that the identity of the object is the object identity associated with one of the one or more predetermined signals if a difference between the received reflected signal and one of the one or more predetermined signals is less than a difference threshold;

determining an extent of matching of the received reflected signal and the one or more predetermined signals, determining, using the processor, a matching index for each of the one or more predetermined signals based on the extent of matching of the received reflected signal with the respective one or more predetermined signals; and displaying, at a display operably connected with the processor, the matching index or the matching indices indicating the extent of matching, and an indication of the determined identity of the object, wherein the matching index is represented by grids of different colors, and wherein the plurality of transmitters and the plurality of receivers are arranged in a Mills cross array, with one horizontal row of transmitters and a vertical column of receivers.

2. The ultra-wideband-based object identification method of claim 1, wherein determining the identity of the object based on the received reflected signal further comprises:

determining presence or absence of the object based on the received reflected signal.

3. The ultra-wideband-based object identification method of claim 1, wherein the one or more predetermined signals comprise a plurality of predetermined signals, and wherein determining whether the identity of the object is the object identity associated with any of the one or more predetermined signals further comprises:

determining that the identity of the object is the object identity associated with one of the predetermined signals based on the best match of the received reflected signal with the one or more predetermined signals.

4. The ultra-wideband-based object identification method of claim 1, wherein the difference threshold is adjustable.

5. The ultra-wideband-based object identification method of claim 1, wherein the difference threshold is fixed.

6. The ultra-wideband-based object identification method of claim 1, further comprising: recording the determined identity of the object and increasing a count associated with the identified object identity by one.

7. The ultra-wideband-based object identification method of claim 1, further comprising providing an alert when the received reflected signal matches none of the one or more predetermined signals.

8. The ultra-wideband-based object identification method of claim 1, wherein the plurality of transmitters and receivers are arranged in a transceiver unit.

9. The ultra-wideband-based object identification method of claim 1, wherein the object is arranged in a container such that the object is not visible.

10. An ultra-wideband-based object identification system, comprising:
- a plurality of transmitters for transmitting an ultra-wideband signal to an object;
- a plurality of receivers for receiving a reflected signal from the object;
- a processor for determining an identity of the object based on the received reflected signal; and
- a display operably connected with the processor; wherein the processor is arranged to:
  - compare the received reflected signal with one or more predetermined signals associated with a known object identity to create a comparison;
  - determine, based on the comparison, whether the identity of the object is the object identity associated with any of the one or more predetermined signals,
  - determine that the identity of the object is the object identity associated with one of the one or more predetermined signals if the received signal matches the one of the one or more predetermined signals, and
  - determine an extent that a difference between the received reflected signal and the predetermined signal matching is less than a threshold, and
  - determine a matching index for each of the one or more predetermined signals based on an extent of matching of the received reflected signal with the respective one or more predetermined signals, and wherein the display is arranged to display the matching index or the matching indices by grids of different colors, and an indication of the determined identity of the object, and wherein the plurality of transmitters and the plurality of receivers are arranged in a Mills cross array, with one horizontal row of transmitters and a vertical column of receivers.

11. The ultra-wideband-based object identification system of claim 10, wherein the processor is further arranged to determine presence or absence of the object based on the received reflected signal.

12. The ultra-wideband-based object identification system of claim 10, wherein the one or more predetermined signals comprises a plurality of predetermined signals, and wherein the processor is arranged to determine whether the identity of the object is the object identity associated with any of the predetermined signals by:
- determining that the identity of the object is the object identity associated with one of the predetermined signals based on the best match of the received reflected signal with the predetermined signals.

13. The ultra-wideband-based object identification system of claim 10, wherein the processor is further arranged to:
- determine whether a difference between the received reflected signal and the one of the one or more predetermined signals is less than a difference threshold; and
- determine that the received reflected signal matches the one of the one or more predetermined signals when the processor determines that the difference is less than the difference threshold.

14. The ultra-wideband-based object identification system of claim 13, wherein the difference threshold is adjustable.

15. The ultra-wideband-based object identification system of claim 13, wherein the difference threshold is fixed.

16. The ultra-wideband-based object identification system of claim 10, wherein the processor is further arranged to record the determined identity of the object and increase a count associated with the identified object identity by one.

17. The ultra-wideband-based object identification system of claim 10, wherein the plurality of transmitters and receivers are arranged in a transceiver unit.

18. The ultra-wideband-based object identification system of claim 10, wherein the object is arranged in a container such that the object is not visible.

19. The ultra-wideband-based object identification system of claim 10, wherein the system is integrated in a portable object identification device.

* * * * *